US011407131B2

(12) United States Patent
Bader

(10) Patent No.: US 11,407,131 B2
(45) Date of Patent: Aug. 9, 2022

(54) LOW PROFILE UNIVERSAL CABLE TIE CUTTING TOOL FOR WIRE DAMAGE PREVENTION

(71) Applicant: THE BOEING COMPANY, Chicago, IL (US)

(72) Inventor: James S. Bader, Auburn, WA (US)

(73) Assignee: THE BOEING COMPANY, Chicago, IL (US)

( * ) Notice: Subject to any disclaimer, the term of this patent is extended or adjusted under 35 U.S.C. 154(b) by 2 days.

(21) Appl. No.: 16/884,633

(22) Filed: May 27, 2020

(65) Prior Publication Data

US 2021/0370533 A1 Dec. 2, 2021

(51) Int. Cl.

*B26B 17/02* (2006.01)
*B26B 25/00* (2006.01)
*H02G 1/00* (2006.01)

(52) U.S. Cl.

CPC ............ *B26B 17/02* (2013.01); *B26B 25/007* (2013.01); *H02G 1/005* (2013.01)

(58) Field of Classification Search

CPC ....... B26B 17/00; B26B 17/02; B26B 25/007; B26B 29/00; H02G 1/005
USPC .................................................... 30/241–243
See application file for complete search history.

(56) References Cited

U.S. PATENT DOCUMENTS 472,139 A * 4/1892 Newton ................. A01K 17/00 30/243
480,246 A * 8/1892 Brosius .................. A01K 17/00 30/243
838,008 A * 12/1906 Chandler et al. .... H01R 43/048 30/242
974,553 A * 11/1910 Cloes .................. B23D 29/026 30/242
1,626,274 A * 4/1927 Duffy ...................... B26B 17/00 30/90.2
1,804,149 A * 5/1931 Clemens .................. C14B 9/00 30/241
2,595,841 A * 5/1952 Glick et al. ............ B23D 23/02 30/241
2,938,266 A * 5/1960 Klein, Jr. ................ B26B 17/00 30/261

(Continued)

FOREIGN PATENT DOCUMENTS

DE 720205 C * 4/1942 ............ B26B 17/02

*Primary Examiner* — Jason Daniel Prone
(74) *Attorney, Agent, or Firm* — Marshall, Gerstein & Borun LLP

(57) ABSTRACT

A cutting tool includes a first arm assembly which includes a first jaw member connected to a first handle. A second arm assembly includes a second jaw member connected to a second handle. The first arm assembly and the second arm assembly are rotatably connected to one another so as to rotate relative to one another. The first jaw member has a first outer surface configured to project away from the first jaw member and defines a first boundary. The second jaw member has a second outer surface configured to project away from the second jaw member and defines a second boundary. A cutting blade is positioned between the first and second jaw members and is positioned spaced apart from the first boundary and the second boundary with the first and second arm assemblies positioned in one of an open position or closed position.

20 Claims, 12 Drawing Sheets

(56) References Cited

U.S. PATENT DOCUMENTS

| | | | | | |
|---|---|---|---|---|---|
| 4,989,325 | A * | 2/1991 | Durkin | B26B 17/003 | 30/243 |
| 5,235,748 | A * | 8/1993 | Jahn | B26D 3/169 | 30/1.5 |
| 5,373,639 | A * | 12/1994 | Huang | B25B 7/12 | 30/242 |
| D416,456 | S * | 11/1999 | Pomeroy | B25B 7/12 | D8/52 |
| 6,467,172 | B1 * | 10/2002 | Jenq | B26D 3/169 | 30/243 |
| 6,725,546 | B1 * | 4/2004 | Dallas | B26B 17/00 | 30/193 |
| 6,735,870 | B2 * | 5/2004 | Nordlin | B26B 17/00 | 30/134 |
| 9,381,622 | B2 * | 7/2016 | Wason | H02G 1/005 | |
| 2008/0060203 | A1 * | 3/2008 | Metcalf | B23D 21/08 | 30/101 |

* cited by examiner

LOW PROFILE UNIVERSAL CABLE TIE CUTTING TOOL FOR WIRE DAMAGE PREVENTION

FIELD

This disclosure relates to a cutting tool and more particularly to a cutting tool used to cut a cable tie which secures a bundle of wires and/or cables.

BACKGROUND

Removing a cable tie from a bundle of wires and/or cables, which are secured by the cable tie, can result in a wire and/or cable within the bundle being nicked, cut or otherwise damaged. In an industry, which installs a large number of wires and/or cables into a structure, such as for example an aircraft, wires and/or cables are delivered to an installer in bundles secured by cable ties. Cable ties include various configurations and are in some examples referred to as zip ties. The bundled wires and/or cables, often need to be separated from a cable tie, without imparting damage to the wires and/or cables confined by the cable tie so as to install the wires and/or cables as needed. Even with taking extreme care in cutting a cable tie with a cutting tool, wires and/or cables within the bundle being damaged is a persistent and widespread issue. Much time and expense is expended to remedy a cut or damaged wire and/or cable as a result of cutting a cable tie with a cutting tool.

Currently, some examples of off the shelf cutting tools include a type of pliers with two exposed single edged blades. The tips of these blades are sharp in order to cleanly cut the cable tie off of the bundled wires and/or cables. The scissoring motion of the blades of a pliers-like cutting tool coming together tends to cause the blades to migrate along the cable tie making precise cutting difficult. In addition, the sharp tips can unintentionally stab one or more of the wires and/or cables in the bundle in using the plier-like cutting tool and particularly with attempting to position one of the blades between the cable tie and the wires and/or cables within the bundle. Similarly, a cutting tool with a single blade design acts as a wedge, pulling the blade toward the wires and/or cables within the bundle as the cut is made, which can impart a cut or nick upon at least one of the bundled wires and/or cables. In use, both of these cutting tools result in frequent inadvertent cutting of wire(s) and/or cable(s) in the bundle proximate to the cable tie being cut. In an example of working with wires and/or cables such as on an aircraft, the smallest nick to a wire and/or cable requires costly replacement.

Further complications arise in attempting to cut cable ties, which secure bundled wires and/or cables with the cable tie located in a confined location and/or is positioned in low lighting. The cutting of the cable tie with the cutting tool takes place without adequate visual feedback. As a result, the frequency of nicking, cutting or otherwise damaging the wire(s) and/or cable(s) in the bundle increases.

Other attempts have been made to remove cable ties from bundled wires and/or cables with less risk of imparting damage to a wire and/or cable within the bundle by way of cutting a locking mechanism or head of the cable tie. Cutting the locking mechanism or head of the cable tie positions the cutting blades further away from the bundled wires than with cutting a band of the cable tie. However, due to time and space constraints of the position of the cable tie, positioning of a cutting blade to cut the cable tie band can still cause the cutting blade to come into contact with wires and/or cables within the bundle, significantly increasing the risk of damaging one or more wires within the bundle. In addition, in the instance of cutting the head of the cable tie, the head can become separated from the cable tie and result in undesired foreign object debris/damage referred to as ("FOD") to the structure being fabricated, such as an aircraft. The possibility of generating unacceptable FOD leads to additional time and expense in searching for FOD and removing FOD.

There is a need to provide a cutting tool which allows a cable tie to be accessed and cut, regardless of how tight a cable tie is secured to the bundle of wires and/or cables and/or the location of the cable tie with respect to space confinement and/or lighting, without imparting damage to a wire and/or cable in the bundle. In addition, there is a need to provide a protective barrier between the blade cutting the cable tie, such that a cutting edge of the blade can readily cut the cable tie and yet not come into contact with the bundled wires and/or cables.

SUMMARY

An example includes a cutting tool, which includes a first arm assembly which includes a first jaw member connected to a first handle and a second arm assembly which includes a second jaw member connected to a second handle. The first arm assembly and the second arm assembly are rotatably connected to one another so as to rotate relative to one another. The first jaw member has a first outer surface configured to project away from the first jaw member and defines a first boundary and the second jaw member has a second outer surface configured to project away from the second jaw member and defines a second boundary. A cutting blade is positioned between the first and second jaw members and is positioned spaced apart from the first boundary and the second boundary with the first and second arm assemblies positioned in one of an open position or a closed position.

An example includes a method for operating a cutting tool which includes positioning a cutting tool on opposing sides of a band of a cable tie, which bundles a plurality of wires and/or cables wherein the cutting tool includes a first arm assembly which includes a first jaw member connected to a first handle and a second arm assembly which includes a second jaw member connected to a second handle. The first arm assembly and the second arm assembly are rotatably connected to one another so as to rotate relative to one another. The first jaw member has a first outer surface which projects away from the first jaw member and defines a first boundary and the second jaw member has a second outer surface which projects away from the second jaw member and defines a second boundary. A cutting blade is positioned between the first and second jaw members and is positioned spaced apart from the first boundary and the second boundary with the first and second arm assemblies positioned in one of an open position or a closed position. The method further includes rotating the first handle and second handle toward one another with the plurality of wires and/or cables positioned on one side of the first and second jaw members and moving the cutting blade, positioned on an opposite side of the first and second jaw members, toward the first and second jaw members with the cutting blade cutting the band of the cable tie positioned on the opposite side of the first and second jaw members spaced apart from the first boundary of the first outer surface of the first jaw member and spaced apart from the second boundary of the second outer surface of the second jaw member.

The features, functions, and advantages that have been discussed can be achieved independently in various examples or may be combined in yet other embodiments further details of which can be seen with reference to the following description and drawings.

DESCRIPTION

Figure 1:
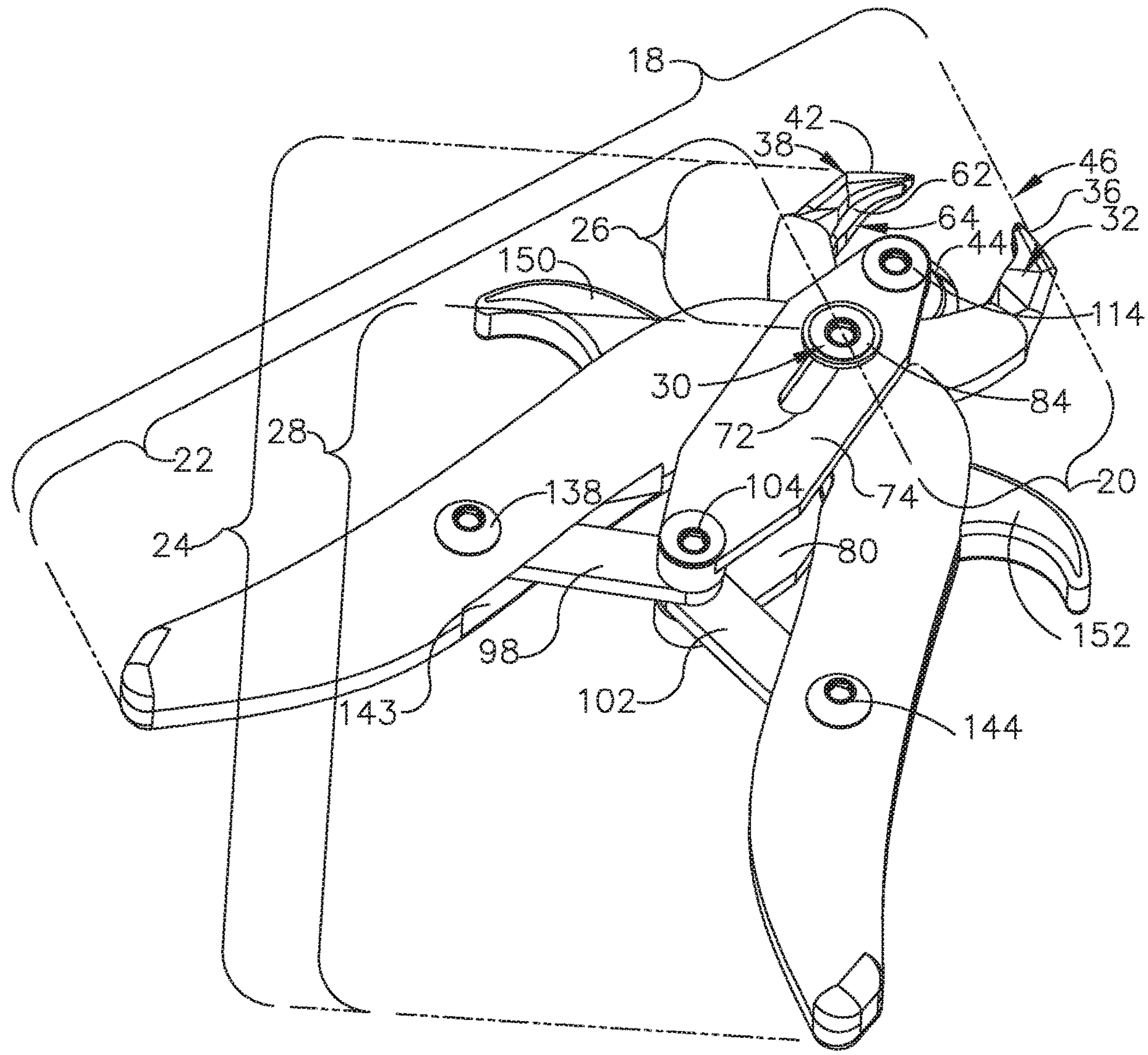
FIG. 1 is a perspective view of a cutting tool in an open position.
Figure 2:
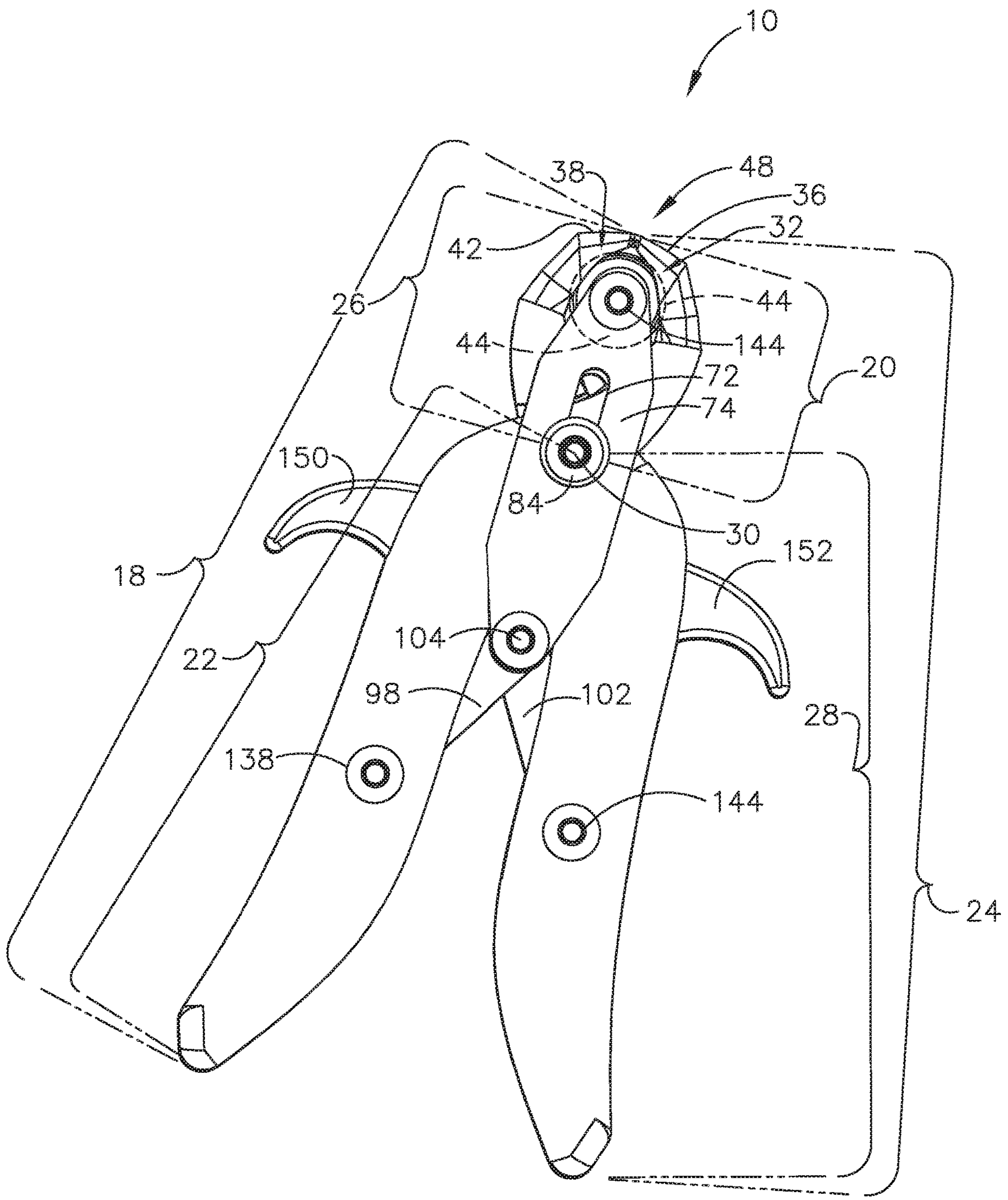
FIG. 2 is the view of the cutting tool of FIG. 1 in a closed position.
Figure 3:
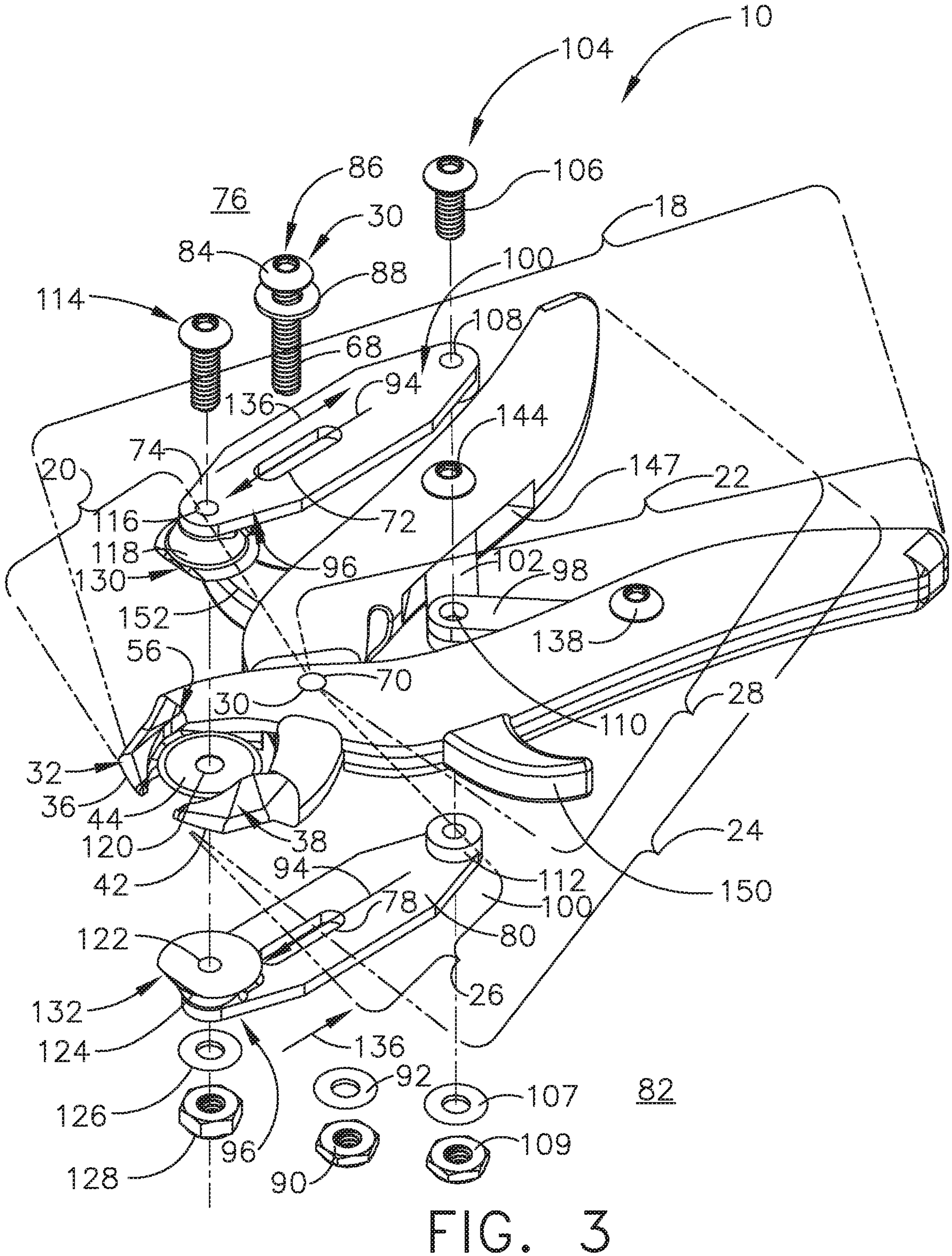
FIG. 3 is a perspective exploded view of the cutting tool.

In referring to FIGS. 1-3, cutting tool 10 is used for cutting cable tie 12, which secure wires and/or cables 14 into a bundle, as seen in FIGS. 5-8. Often a bundle of wires and/or cables 14 need to be separated from a bundle for purposes of installation of wires and/or cables 14 within a structure such as, for example, an aircraft. The bundle of wires and/or cables 14 are held together with various types of cable tie 12 which often include band 16. With cutting of band 16, separate wires and/or cables 14 can be accessed and employed in the fabrication process. As mentioned earlier, it is desired to prevent damage being imparted to the wires and/or cables 14 when cutting band 16 for removal of cable tie 12.

As seen in FIGS. 1-3, cutting tool 10 includes first arm assembly 18, which, in turn, includes first jaw member 20 connected to first handle 22. Cutting tool 10 further includes second arm assembly 24, which, in turn, includes second jaw member 26 connected to second handle 28. In this example, first arm assembly 18 and second arm assembly 24 are each of a single unitary construction. First arm assembly 18 and the second arm assembly 24 are rotatably connected to one another so as to be able to rotate relative to one another about first pivot member 30, which will be herein further described.

Figure 5:
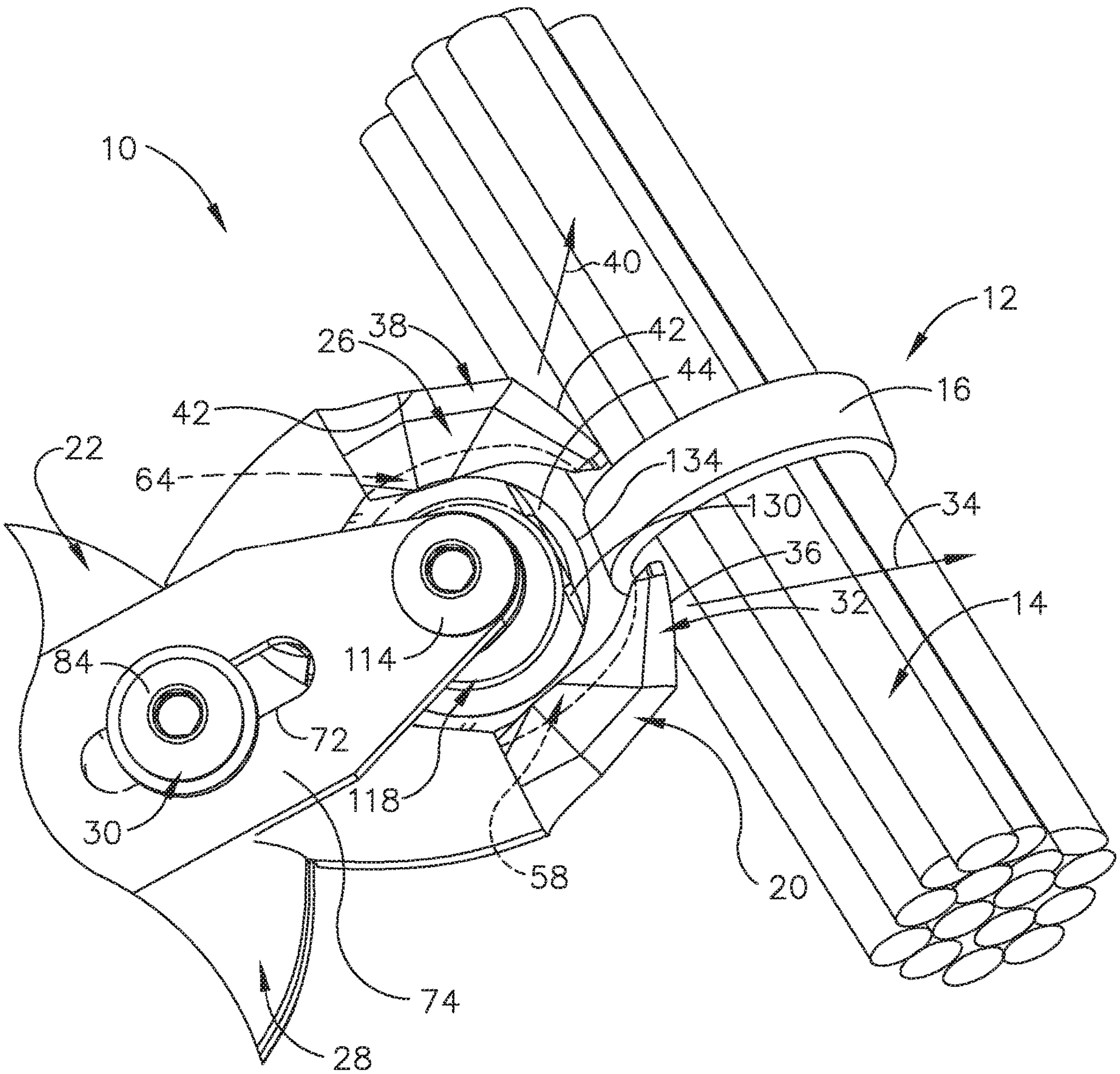
FIG. 5 is a partial plan view of the cutting tool of FIG. 1 with a first and second jaw members positioned on opposing sides of a band of a cable tie to be cut.
Figure 7:
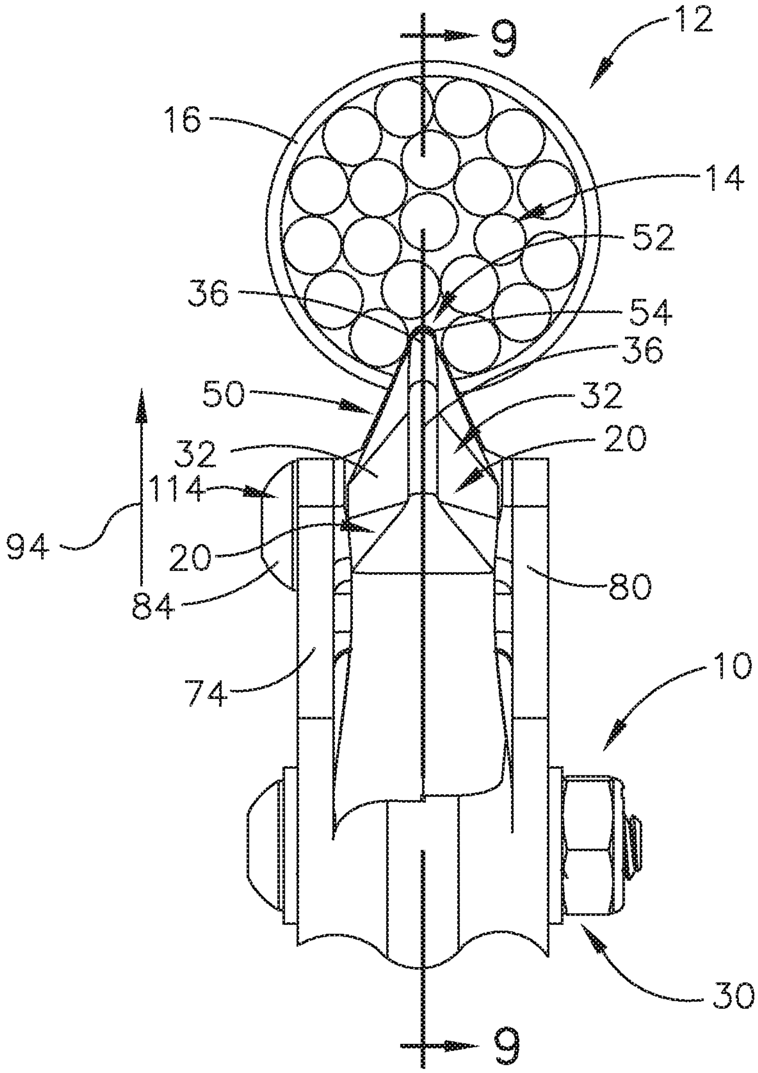
FIG. 7 is a side plan view of the cutting tool of FIG. 6 in the process of cutting the band of the cable tie with a cross section of the wires and/or cables secured in the bundle by the cable tie.
Figure 10:
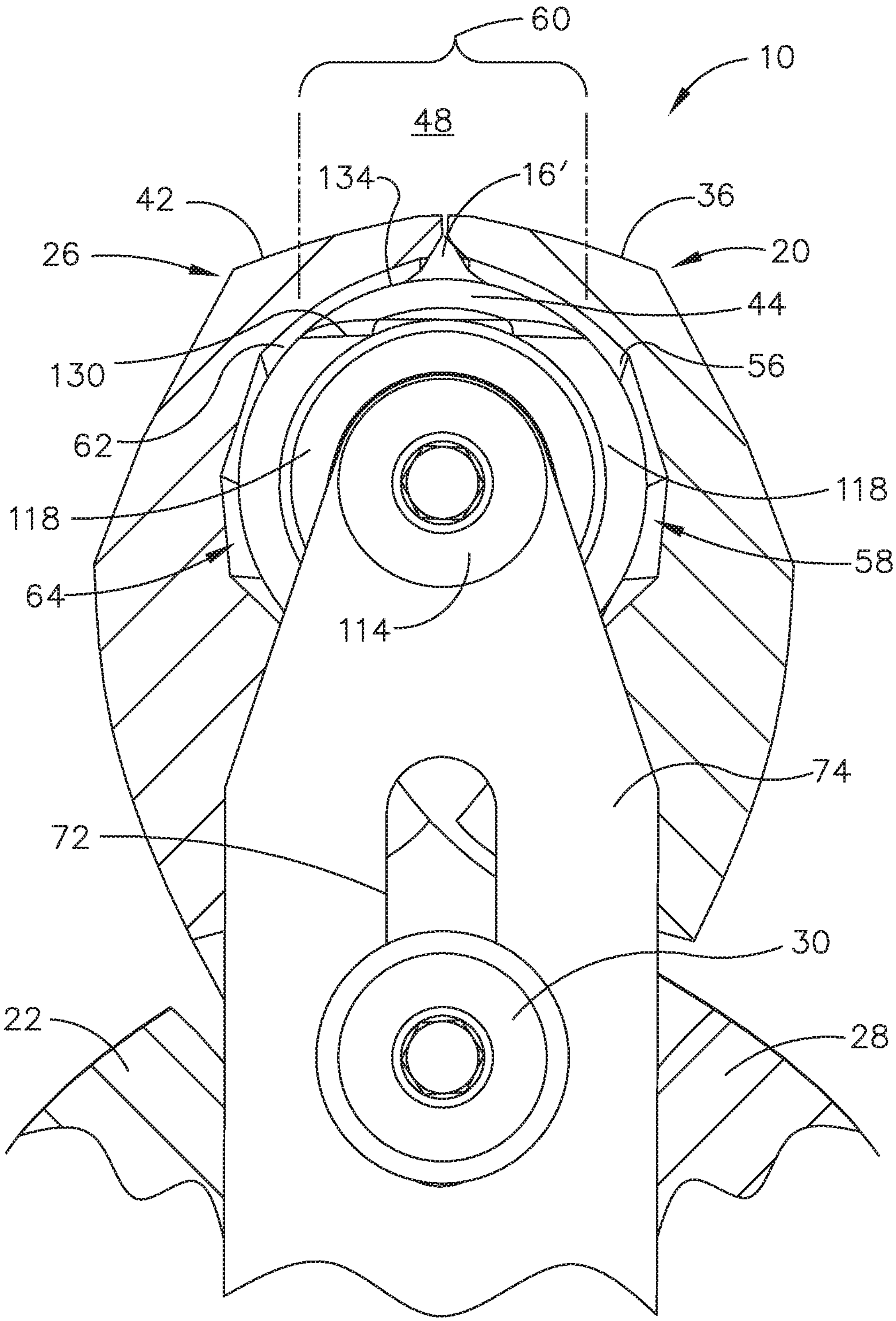
FIG. 10 is a partially enlarged cross section of cutting tool as seen in FIG. 9 with cutting tool in a closed position and with the cutting blade secured to a first translational movement plate with a blade support structure, which are not in a cross section view.

As seen in FIGS. 5, 7 and 10, first jaw member 20 has first outer surface 32, which extends in first direction 34 away from cutting blade 44, as seen in FIG. 5. First outer surface 32 defines first boundary 36, which is an outermost portion of first outer surface 32 of first jaw member 20 of cutting tool 10, wherein first boundary 36 extends along first jaw member 20. Similarly, second jaw member 26 has a second outer surface 38 which extends in second direction 40 away from cutting blade 44, as seen in FIG. 5, wherein in this example first direction 34 is a different direction than second direction 40. Second outer surface 38 defines second boundary 42, which is an outermost portion of second outer surface 38 of second jaw member 26 of cutting tool 10, wherein second boundary 42 extends along second jaw member 26.

"Cutting tool 10, further includes cutting blade 44, as seen in FIGS. 1 and 2, wherein cutting blade 44 is connected to a first and a second translational movement plates 74, 80, which are connected to the first and second handles 22, 28 respectively, such that rotation of the first and second arm assemblies 18, 24 relative to one another moves first and second translational movement plates 74, 80 and cutting blade 44 relative to the pivot member 30. Pivot member 30 extends through a first plate slot 72 and a second plate slot 78 of the first and second translational movement plates 74, 80, respectively. Cutting blade 44 moves with the first and second translational movement plates 74, 80, which move relative to first pivot member 30, with first and second handles 22, 28 moving from an open position as seen in FIG. 1 to a closed position as seen in FIG. 2 and first and second jaw members 20, 26 moving from an open position 46, as seen in FIG. 1, to a closed position 48, as seen in FIG. 2. Cutting blade 44 is positioned between first and second jaw members 20, 26 and positioned spaced apart from first boundary 36 and second boundary 42 with the first and second jaw members 20, 26 positioned in one of an open position 46, as seen in FIG. 1 or closed position 48, as seen in FIG. 2. As will be discussed herein, first jaw member 20 and second jaw member 26 protect wires and/or cables 14 within the bundle from incurring damage by way being positioned between cutting blade 44 and the wires and/or cables 14 when cable tie 12 is cut. As first and second jaw members 20, 26 are closed, as seen in FIGS. 2 and 10, cutting blade 44 cuts band 16 of cable tie 12, resulting in cut band 16', as seen in FIG. 10, and first and second jaw members 20, 26 are positioned between cutting blade 44 and wires and/or cables 14, as seen in FIG. 8, such that cutting blade 44 remains spaced apart from first and second boundaries 36 and 42 of first and second jaw members 20, 26, as seen in FIGS. 8 and 10, resulting in cutting blade 44, as seen in FIG. 8, not coming into contact with wires and/or cables 14.

In referring to FIG. 7, first outer surface 32 has first tapered configuration 50 of first jaw member 20. With respect to FIG. 5, second jaw member 26 similarly has a second tapered configuration (not shown) which is similarly configured with second outer surface 38 as first tapered configuration 50 of first outer surface 32 of first jaw member 20. First end 52 of first tapered configuration 50 has first curved surface 54 wherein second end (not shown) of the tapered configuration (not shown) of second jaw member 26 has a second curved surface (not shown) which is similarly configured as first curved surface 54 of first tapered configuration 50. The tapered configuration of both first and second jaw members 20, 26 provides the user of cutting tool 10, as seen in FIG. 7, the ability to urge first and second jaw members 20, 26 into a plurality of wires and/or cables 14 and to either separate adjacent wires and/or cables 14 or otherwise push wires and/or cables 14 within the bundle away from band 16 of cable tie 12 without imparting damage to wires and/or cables 14. With urging wires and/or cables 14 away from band 16 of cable tie 12 and with closing first and second jaw members 20, 26, first and second jaw members 20, 26 are positioned such that cutting blade 44 and band 16 of cable tie 12 are positioned on one side of first and second jaw members 20, 26 and wires and/or cables 14 are positioned on an opposing side of first and second jaw members 20, 26, as seen in FIG. 6.

Figure 8:
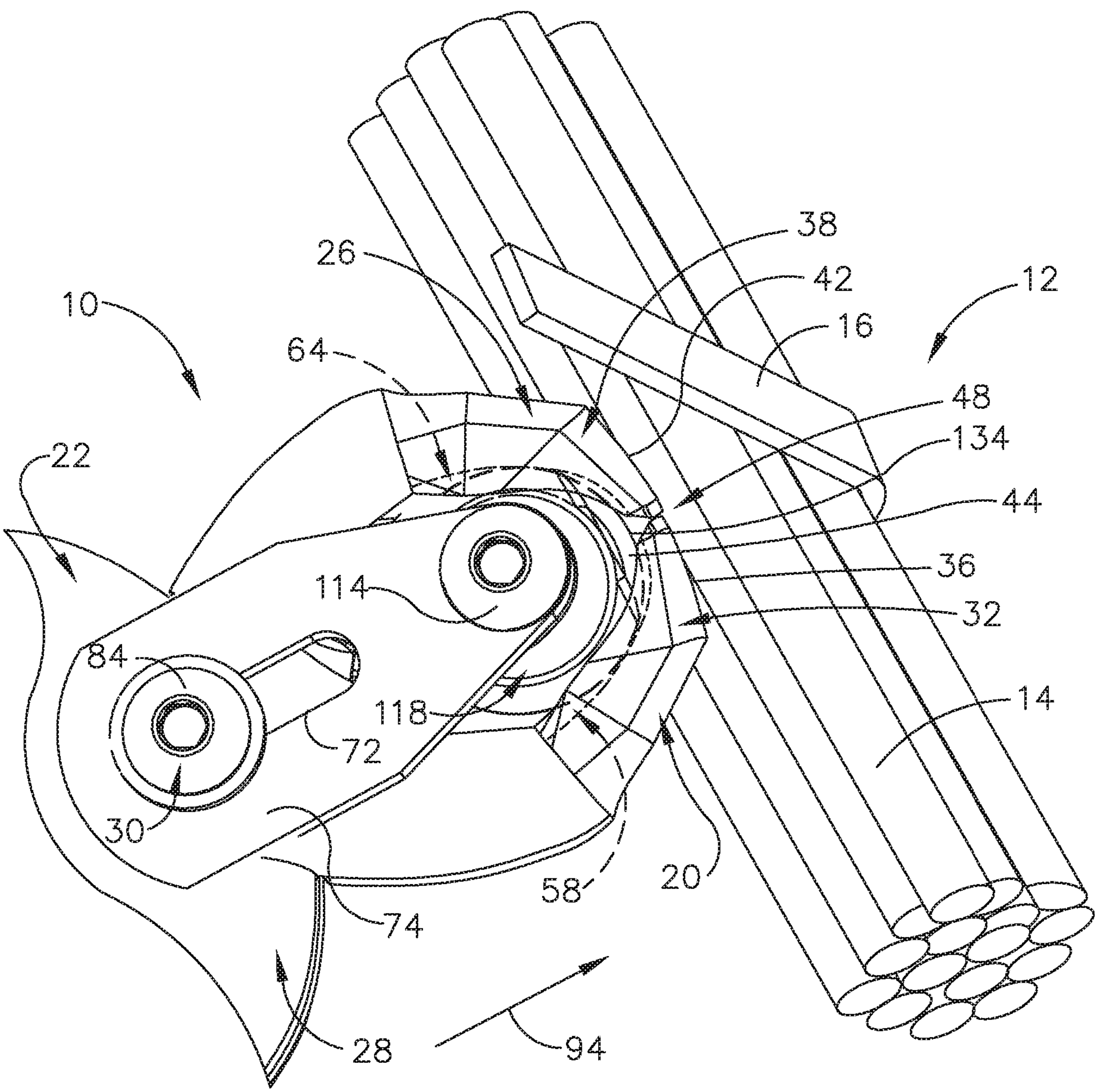
FIG. 8 is the view of the cutting tool of FIG. 6 but with the first and second jaw members of the cutting tool positioned in a closed position and the cutting blade having cut the cable tie.
Figure 9:
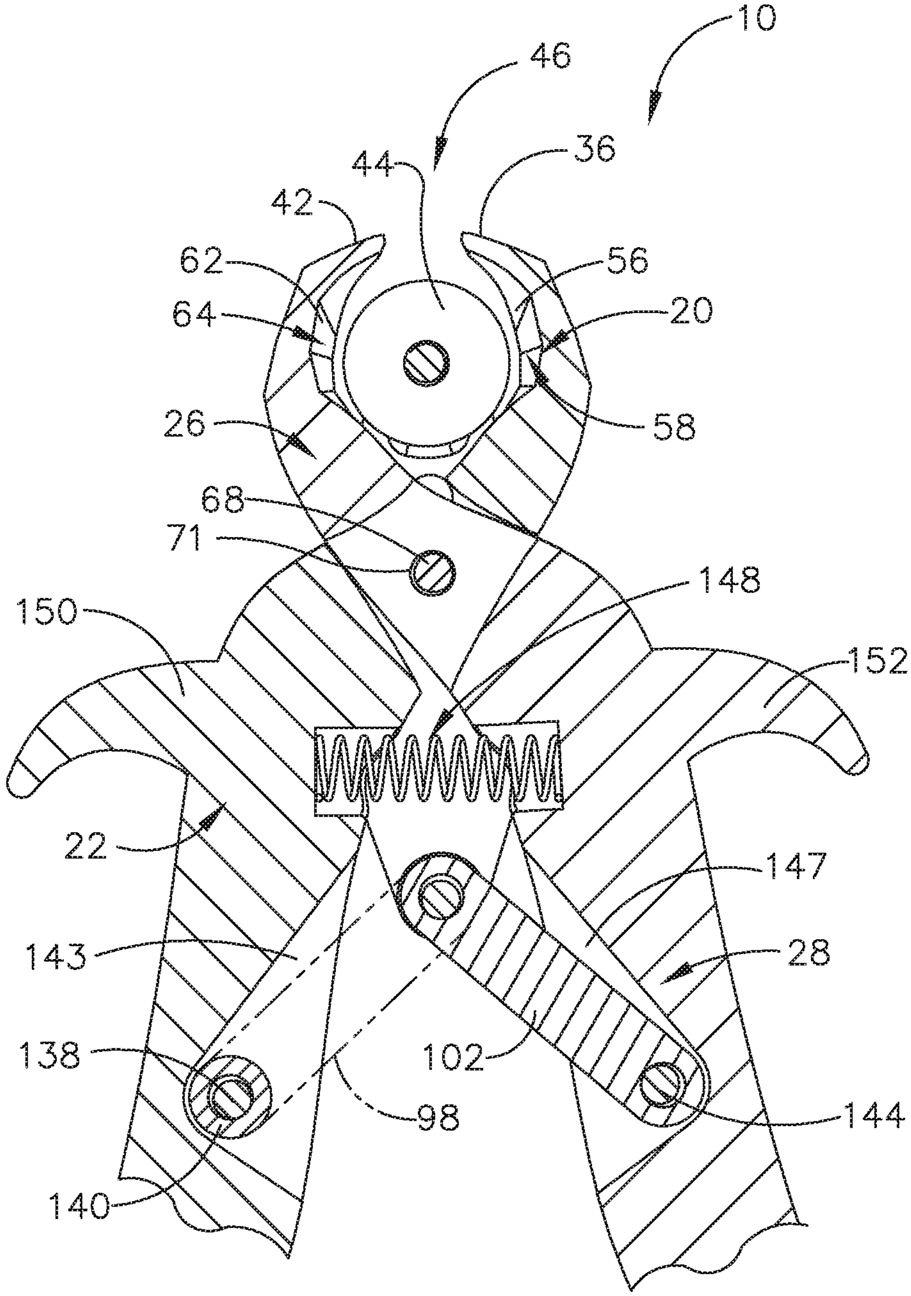
FIG. 9 is a cross section view of the cutting tool as seen along line 9-9 of FIG. 7 with the cutting tool in an open position having a compression spring positioned between first and second handles.
Figure 11:
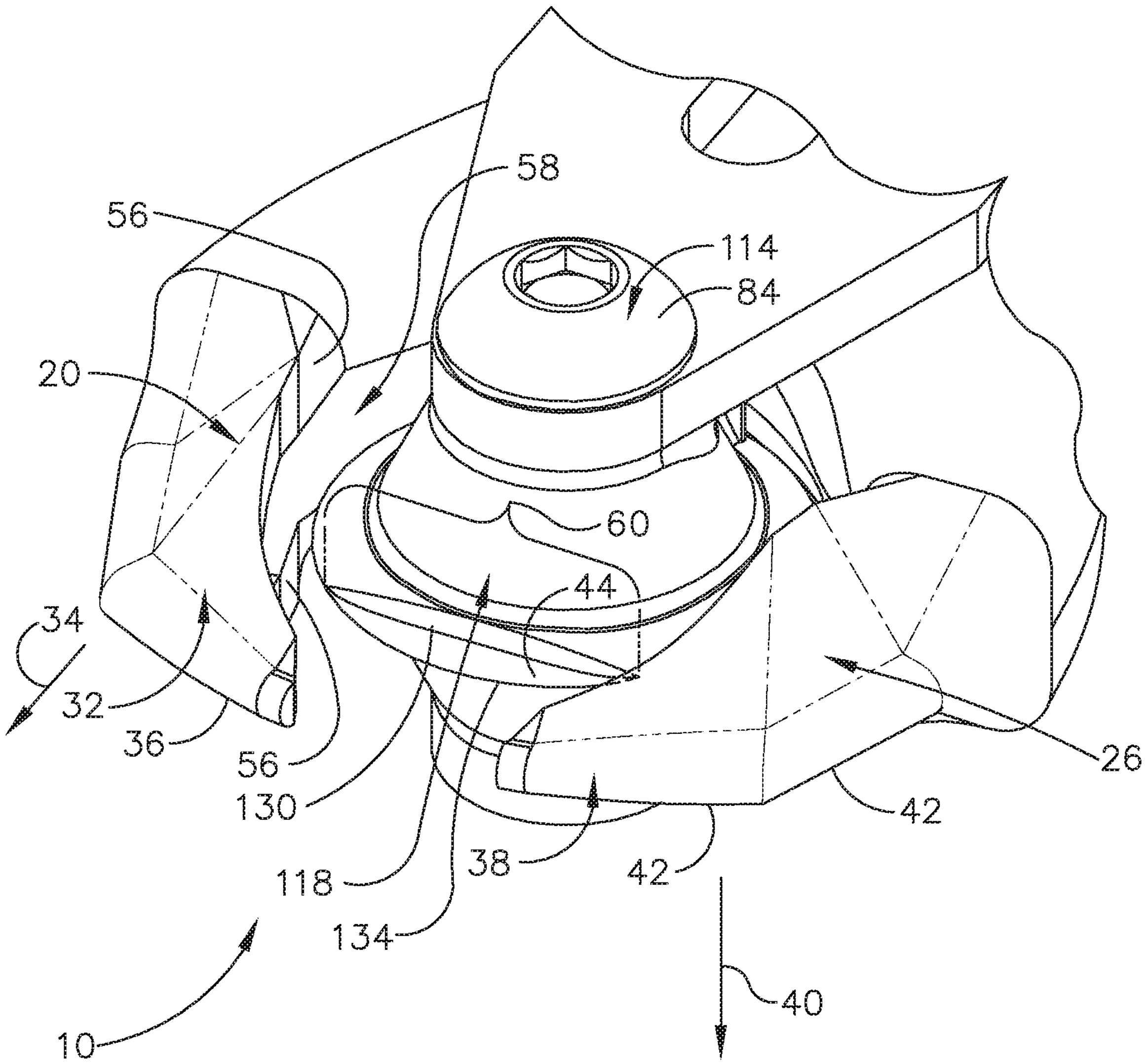
FIG. 11 is an enlarged isolated partial perspective view of the cutting tool of FIG. 6 in a partially closed position.

As seen in FIGS. 5, 6 and 8-11, first jaw member 20 of cutting tool 10 includes first surface 56, as seen in FIG. 11, configured to define first slot 58 wherein a portion of first surface 56 defines an inner portion of first slot 58 within first jaw member 20 as seen in FIGS. 9 and 10. Second jaw member 26 includes second surface 62 defining second slot 64, as seen in FIGS. 1, 9 and 10 and second slot 64 is similarly configured as first slot 58 of first jaw member 20. First slot 58 and second slot 64 are configured to receive cutting blade 44, as seen in FIG. 10 as first and second jaw members 20, 26 are placed in closed position 48 and band 16 is cut and becomes cut band 16' of cable tie 12. In addition, in this example, as will be further discussed, first and second blade supports 118, 124, seen in FIG. 3, secure cutting blade 44 to cutting tool 10 and also in this example enclose a portion of cutting blade 44. Blunted portions 130, 132, as seen in FIG. 3, permit portion 60 of cutting blade 44 to be exposed, as seen in FIG. 10 for cutting band 16 and a remainder of cutting blade 44, in this example, is enclosed between first and second blade supports 118, 124. As a result, first and second slots 58, 64 are configured in this example to accommodate portion 60 of cutting blade 44 and a portion of cutting blade 44 which is enclosed within first and second blade supports 118, 124. As a result, both cutting blade 44 and portions of first and second blade supports 118, 124 which enclose cutting blade 44 are received within first and second slots 58 and 64 as first and second jaw members 20, 26 move to and attain closed position 48. In this movement of first and second jaw members 20, 26 moving to and attaining closed position 48, cutting blade 44 and first and second blade supports 118, 124 remain spaced apart from first and second boundaries 36, 42 of first and second jaw members 20, 26 protecting wires and/or cables of the bundle secured by cable tie 12.

Figure 6:
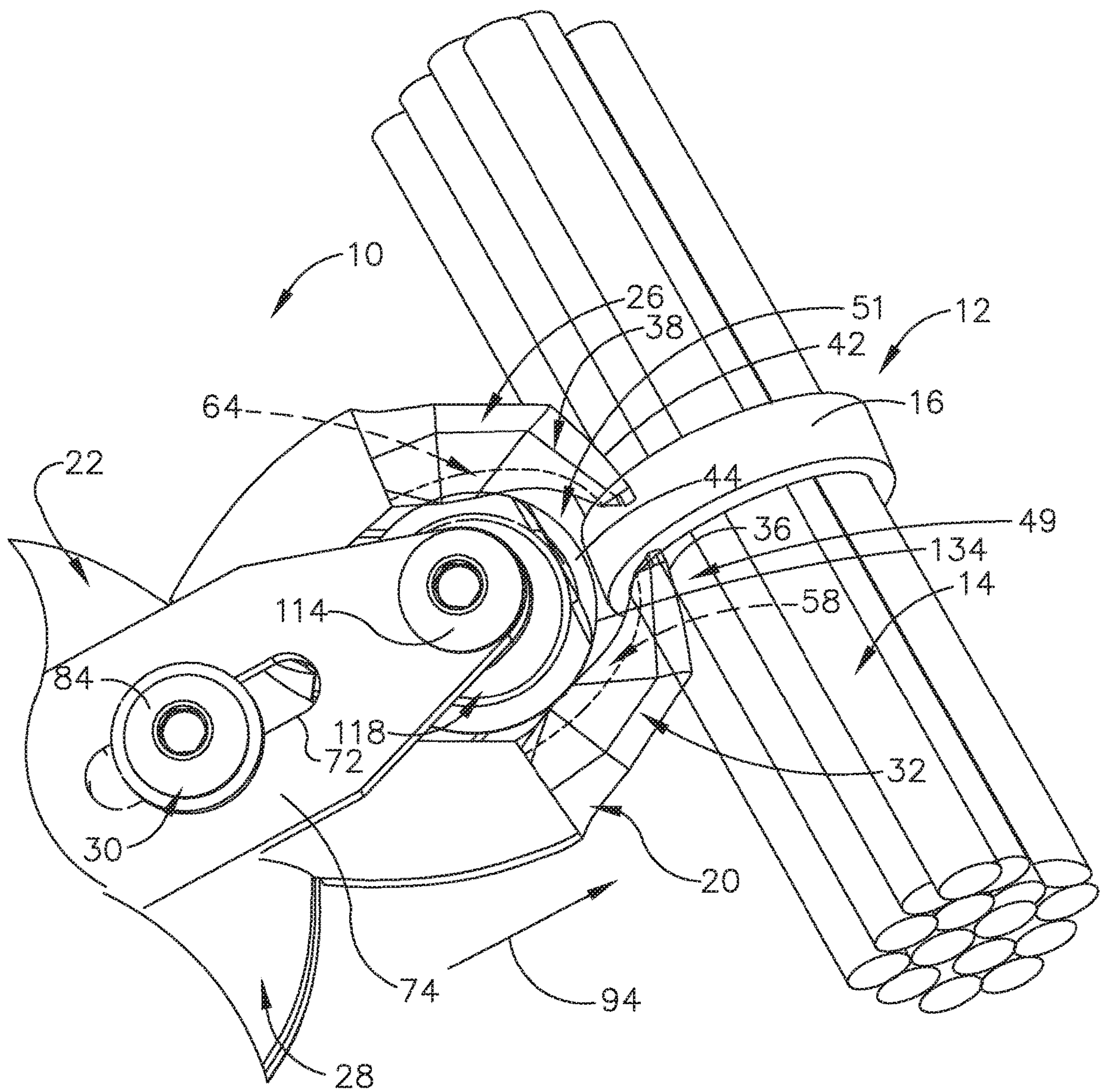
FIG. 6 is the view of the cutting tool of FIG. 5 but with the first and second jaw members partially closed and partially positioned between the cable tie to be cut and the bundle of wires and/or cables.

As cutting tool 10 moves cutting blade 44, as will be discussed herein, toward band 16 and progresses through cutting band 16, as seen in FIGS. 5, 6 and 8, to become cut band 16' as seen in FIG. 10, portion 60 of cutting blade 44, in this example, enters first and second slots 58, 64 of first jaw member 20 and second jaw member 26, as mentioned above, and is retained within first and second slots 58, 64 spaced apart and behind first boundary 36 of first jaw member 20 and spaced apart and behind second boundary 42 of second jaw member 26, as seen in FIGS. 8 and 10. At a time cutting blade 44 cuts band 16, first and second jaw members 20, 26 attain closed position 48. As a result, portion 60 of cutting blade 44, as well as first and second blade supports 118, 124 which secure cutting blade 44, are blocked from extending beyond first and second boundaries 36, 42 of first and second jaw members 20, 26 preventing cutting blade 44 and first and second blade supports 118, 124 from coming into contact with wires and/or cables 14.

Figure 4:
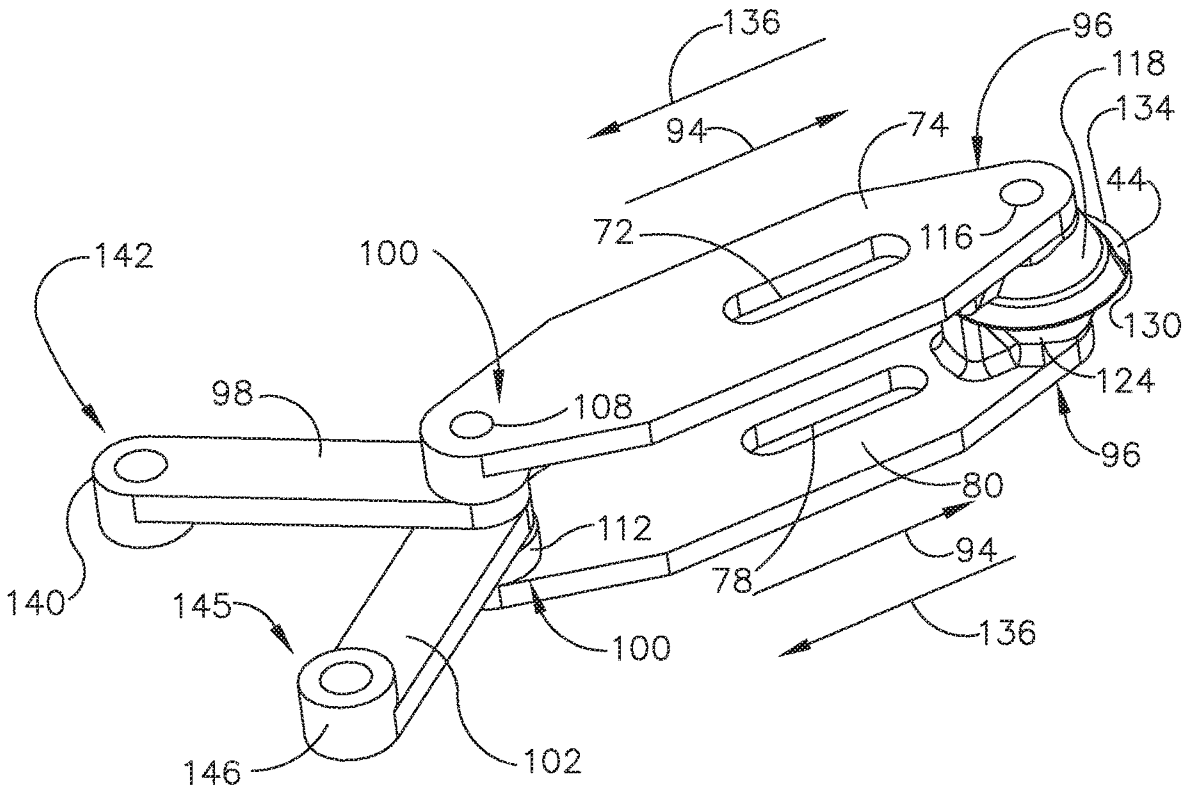
FIG. 4 is an isolated perspective view of first and second transmission movement plates of the cutting tool, which are secured to a cutting blade and secured to a first lever arm and a second lever arm.

In referring to FIGS. 3 and 4, operational components of cutting tool 10 are shown. First pivot member 30 includes threaded shaft 68, which extends through first opening 70 in first arm assembly 18 and through second opening 71 in second arm assembly 24, as seen in FIG. 9, wherein first opening 70 and second opening 71 are of a greater dimension than that of threaded shaft 68 permitting first arm assembly 18 and second arm assembly 24 to rotate relative to one another about threaded shaft 68. Threaded shaft 68 of first pivot member 30 also extends through first plate slot 72 defined by first translational movement plate 74 positioned on first side 76 of cutting tool 10, wherein first plate slot 72 has a greater dimension than first pivot member 30 so as to permit first pivot member 30 to slide along first plate slot 72. Threaded shaft 68 of first pivot member 30 also extends through second plate slot 78 defined by second translational movement plate 80 positioned on second side 82 of cutting tool 10, wherein second plate slot 78 has a greater dimension than first pivot member 30 so as to permit first pivot member 30 to slide along second plate slot 78. This arrangement permits first arm assembly 18 and second arm assembly 24 to rotate relative to one another about first pivot member 30 so as to move first and second jaw members 20, 26 between open and closed positions 46, 48. With threaded shaft 68 extending through first and second plate slots 72, 78, first and second translational movement plates 74, 80 are permitted to have translational movement relative to first pivot member 30 independent of rotation of first and second arm assemblies 18, 24 about first pivot member 30. As will be discussed in more detail herein, the rotation of first and second arm assemblies 18, 24 will translationally move both first and second translational movement plates 74, 80 and cutting blade 44, which is secured to first and second translational plates 74, 80, relative to first pivot member 30. In addition, rotation of first and second arm assemblies 18, 24, at the same time, moves first and second jaw members 20, 26 between open and closed positions 46, 48, as seen in FIGS. 1 and 2.

In this example, as first and second jaw members 20, 26 are moved by first and second arm assemblies 18, 24 to attain closed position 48, as seen in FIGS. 8 and 10, cutting blade 44 is moved toward first and second jaw members 20, 26 to cut band 16 of cable tie 12 as first and second jaw members 20, 26 attain closed position 48. First and second jaw members 20, 26 are moved to open position 46, as seen in FIG. 1, with moving first and second arm assemblies 18, 24 so as to move first and second jaw members 20, 26 apart, which causes cutting blade 44 to move away from first and second jaw members 20, 26. The interconnection of first and second arm assemblies 18, 24 to each other for providing movement for first and second jaw members 20, 26 and to first and second translational movement plates 74, 80 and cutting blade 44 will be herein discussed. The rotation of first and second arm assemblies 18, 24 translationally move cutting blade 44 to cut band 16 and at the same time move first and second jaw members 20, 26 to closed position 48 positioning first and second jaw members 20, 26 between cutting blade 44 and wires and/or cables 14 at the time cutting blade 44 cuts band 16. This interconnection will also translationally move cutting blade 44 so as to retract away from a position in which cutting blade 44 cut band 16 and at the same time move first and second jaw members 20, 26 toward open position 46 ensuring cutting blade 44 stays away from the bundle of plurality of wires and/or cables 14 and the installer, with first and second jaw members 20, 26 in open position 46.

In this example of cutting tool 10, as seen in FIG. 3, first pivot member 30 includes head 84 positioned at one end 86 of threaded shaft 68 which has first washer 88 positioned between head 84 and first translational movement plate 74. First pivot member 30 further includes nut 90 with second washer 92 positioned between nut 90 and second translational movement plate 80. With first washer 88 positioned on first translational movement plate 74 and second washer 92 positioned on second translational movement plate 80, first and second washers 88, 92, under a compressive force applied by securing first pivot member 30 with nut 90, are able to slide along first and second translational movement plates 74, 80. As will be discussed, first and second translational movement plates 74, 80 translationally move relative to first pivot member 30 as first and second arm assemblies 18, 24 are rotated relative to one another about first pivot member 30 and with first and second arm assemblies 18, 24 being connected to first and second translational movement plates 74, 80.

With first pivot member 30 positioned extending through first plate slot 72, first opening 70 of first arm assembly 18, second opening 71 of second arm assembly 24 and through second plate slot 78, first and second plate slots 72, 78 are positioned aligned and extend along in third direction 94. With first opening 70 of first arm assembly 18 and second opening 71 of second arm assembly 24 dimensioned having a greater width than a diameter dimension of first pivot member 30, in this example, first arm assembly 18 and second arm assembly 24 are permitted to rotate relative to one another and about first pivot member 30, as previously mentioned. As a result, first arm assembly 18 and second arm assembly 24 can rotate relative to one another and first and second translational movement plates 74, 80 are permitted to slide along first pivot member 30 along first and second plate slots 72, 78, as will be discussed, and first and second jaw members 20, 26 are moved between open and closed positions 46, 48.

Cutting blade 44, as seen in FIGS. 3 and 4, is affixed to first end portion 96 of first translational movement plate 74 and to first end portion 96 of second translational movement plate 80, which be later discussed. First lever arm 98 is rotatably connected to second end portion 100 of the first and second translational movement plates 74, 80 and second lever arm 102 is also rotatably connected to second end portion 100 of first and second translational movement plates 74, 80. Second pivot member 104, which includes threaded shaft 106, extends through third opening 108 defined by second end portion 100 of first translational movement plate 74, wherein third opening 108 in this example is of a greater dimension than threaded shaft 106 such that third opening 108, in this example, permits first translational movement plate 74 to freely rotate about threaded shaft 106. Threaded shaft 106 extends through fourth opening 110 defined by first lever arm 98 and through fifth opening (not shown) defined by second lever arm 102. Fourth opening 110 and fifth opening (not shown) have a greater dimension than threaded shaft 106 such that fourth opening 110 and fifth opening (not shown) which permits first and second lever arms 98, 102 to freely rotate relative to threaded shaft 106.

Threaded shaft 106 extends through receptacle opening 112 of second translational movement plate 80, wherein receptacle opening 112 has a greater dimension in this example than threaded shaft 106 permitting second translational movement plate 80 to rotate relative to threaded shaft 106. Threaded shaft 106 further extends through third washer 107. Third washer 107 is positioned between second translational movement plate 80 and nut 109. Threads of nut 109 engages threaded shaft 106 of second pivot member 104 providing linkage between first and second lever arms 98, 102 and first and second translational movement plates 74, 80. This arrangement has first lever arm 98 and second lever arm 102 able to rotate relative to one another and permits first lever arm 98, second lever arm 102 to impart translational movement to first and second translational movement plates 74, 80, with first and second lever arms 98, 102 rotatably connected to first and second handles 22, 28 of first and second arm assemblies 18, 24, to be discussed. With opening of first and second handles 22, 28 and with first and second lever arms 98, 102 rotatably connected to first and second handles 22, 28, first and second lever arms 98, 102 rotate away from one another and pull first and second translational movement plates 74, 80 in fourth direction 136, opposite to third direction 94, as shown in FIG. 3. With closing of first and second handles 22, 28, first and second lever arms 98, 102 rotate toward each other and push first and second translational movement plates 74, 80 in third direction 94.

With moving first and second handles 22, 28, of first and second arm assemblies 18, 24, toward each other translational movement is imparted to cutting blade 44, which is affixed to first end portion 96 of first and second translational movement plates 74, 80. First plate slot 72, second plate slot 78 and cutting blade 44 are, in this example, in alignment in third direction 94. With movement of first and second handles 22, 28 toward one another translational movement of first and second translational movement plates 74, 80 is imparted with first and second lever arms 98, 102, as mentioned above, moving cutting blade 44 in third direction 94 relative to first pivot member 30. Moving cutting blade in third direction 94 relative to first pivot member 30, moves cutting blade 44 toward band 16, as seen in FIGS. 5 and 6, which at the same time is moving first and second jaw members 20, 26 toward each other pulling band 16 away from plurality of wires and/or cables 14 and positioning first and second jaw members 20, 26 on first side 49 of first and second jaw members 20, 26 and positioning band 16 and cutting blade 44 on an opposite side 51 of first and second jaw members 20, 26, as seen in FIG. 6. At the same time cutting blade 44 is moved in third direction 94 and cuts band 16, first and second jaw members 20, 26 attain closed position 48 as seen in FIGS. 5, 6, 8 and 10.

In referring to FIG. 3, cutting blade 44 is affixed to first end portion 96 of first and second translational movement plate 74, 80 with third connector 114. Third connector 114, in this example, extends through fifth opening 116 defined by first translational movement plate 74 and through sixth opening (not shown) defined by first blade support 118. Third connector 114 further extends through seventh opening 120 defined by cutting blade 44; through eighth opening 122 of second blade support 124; and through ninth opening (not shown) defined in first end portion 96 of second translational movement plate 80. Third connector 114 extends through ninth opening (not shown) and is engaged in this example with third washer 126 and nut 128. Cutting blade 44 is fixedly secured to cutting tool 10 with tightening of third connector 114. Both first and second blade supports 118, 124 exert a compression securement force onto cutting blade 44. Each of first and second blade supports 118, 124 have blunted portions 130, 132, which defines exposure of leading edge 134 of cutting blade 44 positioned outside first and second blade supports 118, 124. In this example, first and second blade supports 118, 124 enclose cutting blade 44 except for portion 60 which includes leading edge 134, as seen in FIG. 10, which is exposed extending from blunted portion 130 and from blunted portion 132 (not shown). In this example of cutting tool 10, with a need to change leading edge 134 of cutting blade 44, used in cutting band 16 of cable tie 12, the user simply loosens third connector 114, rotates cutting blade 44 and re-tightens third connector 114.

With respect to rotatable connection of first and second lever arms 98, 102 to first and second handles 22, 28 of first and second arm assemblies 18, 24, first lever arm 98 is rotatably connected to first handle 22 and second lever arm 102 is rotatably connected to second handle 28. With first handle 22 and second handle 28 moved toward each other first and second lever arms 98, 102 move rotatably toward one another about second pivot member 104 and impart translational movement to first and second translational movement plates 74, 80 thereby moving cutting blade 44 in third direction 94 toward first and second jaw members 20, 26, which are at the same time moving toward one another to attain closed position 48. Alternatively, with first handle 22 and second handle 28 moved away from each other first and second lever arms 98, 102 move rotatably away from one another about second pivot member 104 and impart translational movement to first and second translational movement plates 74, 80 thereby moving cutting blade 44 in fourth direction 136, in opposite direction to the third direction 94, away from first and second jaw members 20, 26, which are moving away from one another to attain open position 46.

First handle 22 is rotatably connected to first lever arm 98 such that first lever arm 98 rotates relative to first handle 22, as seen in FIGS. 1-4 and second handle 28 is rotatably connected to second lever arm 102 such that second lever arm 102 rotates relative to second handle 28. Threaded bolt 138 extends through tenth opening (not shown) defined by first handle 22 wherein the tenth opening (not shown) is dimensioned larger than threaded bolt 138 such as to permit first handle 22 to rotate relative to threaded bolt 138. Threaded bolt 138 is received through open receptacle 140 positioned at end portion 142 of first lever arm 98. With threaded bolt 138 extending through open receptacle 140, open receptacle 140 is of a larger dimension than threaded bolt 138 such that open receptacle 140 of first lever arm 98 is free to rotate about threaded bolt 138. Threads of threaded bolt 138 engage threads (not shown) of an opening (not shown) defined by first handle 22 resulting in first lever arm 98 being rotatable about threaded bolt 138. Threaded bolt 138 maintains a fixed axis of rotation between first handle 22 and first lever arm 98.

Similarly, second handle 28 is connected to second lever arm 102 such that second lever arm 102 rotates relative to second handle 28, as is discussed above with respect to first lever arm 98 and first handle 22. Threaded bolt 144 extends through eleventh opening (not shown) defined by second handle 28 wherein the eleventh opening (not shown) is dimensioned larger than threaded bolt 144 such as to permit second handle 28 to rotate relative to threaded bolt 144. Threaded bolt 144 is received through open receptacle 146 positioned at end portion 145 of second lever arm 102. With threaded bolt 144 extending through open receptacle 146, open receptacle 146 is of a larger dimension than threaded bolt 144 such that open receptacle 146 of second lever arm 102 is free to rotate about threaded bolt 144. Threads of threaded bolt 144 engage threads (not shown) of an opening (not shown) defined by second handle 28 resulting in second lever arm 102 being rotatable about threaded bolt 144. Threaded bolt 144 maintains a fixed axis of rotation between second handle 28 and second lever arm 102.

In referring to FIGS. 1-4 and 9, open receptacle 140 is positioned within slot 143 defined by first handle 22, such that first lever arm 98 arm can rotate about threaded bolt 138 and first lever arm 98 can be received and exit a portion of slot 143 as needed with rotation of first lever arm 98 relative to first handle 22. Open receptacle 146 is positioned within slot 147 defined by second handle 28, such that second lever arm 102 can rotate about threaded bolt 144 and second lever arm 102 can be received and exit a portion of slot 147 as needed with rotation of second lever arm 102 relative to second handle 28.

This arrangement, of connecting of first and second handles 22, 28 by way of first and second lever arms 98, 102 to first and second translational movement plates 74, 80, facilitates, with moving first and second handles 22, 28 together, first and second lever arms 98, 102 rotate about second pivot member 104 and rotate relative to threaded bolts 138, 144, imparting translational movement of first and second translational movement plates 74, 80 and cutting blade 44 in third direction 94. With moving first and second handles 22, 28 apart from one another first and second lever arms 98, 102 rotate about second pivot member 104 and rotate relative to threaded bolts 138, 144 which results in translating movement of first and second translational movement plates 74, 80 and cutting blade 44 in fourth direction 136, opposite to third direction 94.

In referring to FIGS. 2, 8 and 10, with the first and second handles 22, 28 moved together, as seen in FIG. 2, first and second jaw members 20, 26 are positioned in a closed position 48. Cutting blade 44 is positioned spaced apart from first boundary 36 of first outer surface 32 of first jaw member 20 and spaced apart from second boundary 42 of the second outer surface 38 of second jaw member 26 with cutting blade 44 having cut band 16 as seen in FIG. 8 resulting in cut band 16' of FIG. 10. With cutting blade 44 having cut band 16, portion 60 of cutting blade 44, as seen in FIG. 10, is positioned within first and second slots 58, 64 of first and second jaw members 20, 26. With cutting blade 44 having cut band 16 and cutting blade 44 positioned in first and second slots 58, 64 of first and second jaw members 20, 26, cutting blade 44 is positioned spaced apart from first boundary 36 and second boundary 42 and wires and/or cables 14 are not contacted and thereby not damaged by cutting blade 44.

As seen in FIGS. 5-8, installer places first and second jaw members 20, 26 on opposing sides of band 16 to be cut. Installer in this example urges first and second jaw members 20, 26 into the bundle of wires and/or cables 14, as seen for example in FIG. 7, and begins moving first and second handles 22, 28 together, which begins closing first and second jaw members 20, 26 as seen for example in FIG. 6. The installer can urge and begin closing first and second jaw members at the same time or in any order or sequence so long as first and second jaw members 20, 26 move between band 16 and wires and/or cables 14.

As first and second jaw members 20, 26 continue to be closed together, as seen in FIG. 6, with closing of first and second handles 22, 28, plurality of wires and/or cables 14 are positioned on one side 49 of first and second jaw members 20, 26 and band 16 and cutting blade 44 are positioned on an opposite side 51 of first and second jaw members 20, 26. As first and second jaw members 20, 26 move closer to closed position 48, with further closing together of first and second handles 22, 28, first and second translational movements plates 74, 80 continue to move cutting blade 44 in third direction 94 toward band 16, which is positioned on the same opposite side 51 of first and second jaw members 20, 26 as cutting blade 44.

With moving first and second jaw members 20, 26 toward a closing position, band 16 of cable tie 12 has been pulled away from the bundle of wires and/or cables 14. As cutting tool 10 attains a closed position 48, cutting blade 44 has been moved in third direction 94 sufficiently, by first and second translational movement plates 74, 80, to cut band 16 to result in cut band 16' as seen in FIG. 10. With first and second jaw members 20, 26 in closed position 48, cutting blade 44 is positioned spaced apart from first and second boundaries 36, 42 of first and second jaw members 20, 26. Portion 60 of cutting blade 44, with having cut band 16, move into first and second slots 58, 64 of first and second jaw members 20, 26, respectively and in this example also portions of first and second blade supports 118, 124 move into first and second slots 58, 64. With portion 60 of cutting blade 44 having cut band 16 and positioned within first and second slots 58, 64, cutting blade 44 has remained spaced apart from first and second boundaries 36, 42 of first and second jaw members 20, 26 thereby not permitting cutting blade 44, and in this example, also not permitting first and second blade supports 118, 124 from coming into contact with any wires and/or cables 14 of the bundle.

As seen in FIG. 9 compression spring 148 is shown positioned, in this example, between first and second handles 22, 28. Compression spring 148 provides installer ease in operation of cutting tool 10 with maintaining cutting tool 10 in a default open position 46. This arrangement also permits the installer ease in positioning first and second jaw members 20, 26 on opposing sides of band 16 to be cut, as seen in FIG. 5. With installer closing first and second handles 22, 28 and having cut band 16, compression spring 148 has been compressed and can move first and second jaw members 20, 26 back to open position 46 placing cutting tool 10 in a position for installer to address cutting another band 16.

As seen in FIGS. 1-3 and 9, first handle 22 has first projection member 150 extending away from first handle 22 and second handle 28 has second projection member 152 extending away from second handle 28. First and second projection members 150, 152 provide the installer a portion of cutting tool 10 upon which to exert a force in pushing first and second projection members 150, 152 toward and into the bundle of wires and/or cables 14 with one hand on the cutting tool 10.

With exerting a force onto first and second projection members 150, 152, the installer can urge, with a hand holding cutting tool 10, first and second jaw members 20, 26 against wires and/or cables 14, as discussed earlier, so as to facilitate first and second jaw members 20, 26 into position so as to pull band 16 away from bundle of wires and/or cables 14. First and second projection members 150, 152 assist the installer to position first and second jaw members 20, 26 for use with respect to the plurality of wires and/or cables 14. Installer can position their hand against first and second projection members 150, 152 and push against first and second projection members 150, 152 and insert first and second jaw members 20, 26 into bundle of plurality of wires and/or cables 14. With first and second jaw members 20, 26 inserted into the bundle of plurality of wires and/or cables 14, the bundle of plurality of wires and/or cables 14 are positioned on one side 49 of first and second jaw members 20, 26, as seen in FIG. 6. With first and second jaw members 20, 26 moved to closed position 48, as seen in FIG. 2, first and second jaw members 20, 26 have cutting blade 44 and band 16 positioned on opposing side 51 of first and second jaw members 20, 26. With first and second jaw members attaining closed position 48, cutting blade 44 cuts band 16 as seen in FIG. 8. The installer, with the same hand which holds cutting tool 10, closes first and second handles 22, 28, which close first and second jaw members 20, 26 and moves cutting blade 44 in third direction 94 so as to cut band 16. At the same time band 16 is cut, first and second jaw members 20, 26 attain closed position 48 protecting the wires and/or cables 14 with maintaining cutting blade 44 spaced apart from first and second boundaries 36, 42 and thereby from being contacted and damaged by cutting blade 44 and in this example additionally by first and second blade supports 118, 124.

Figure 12:
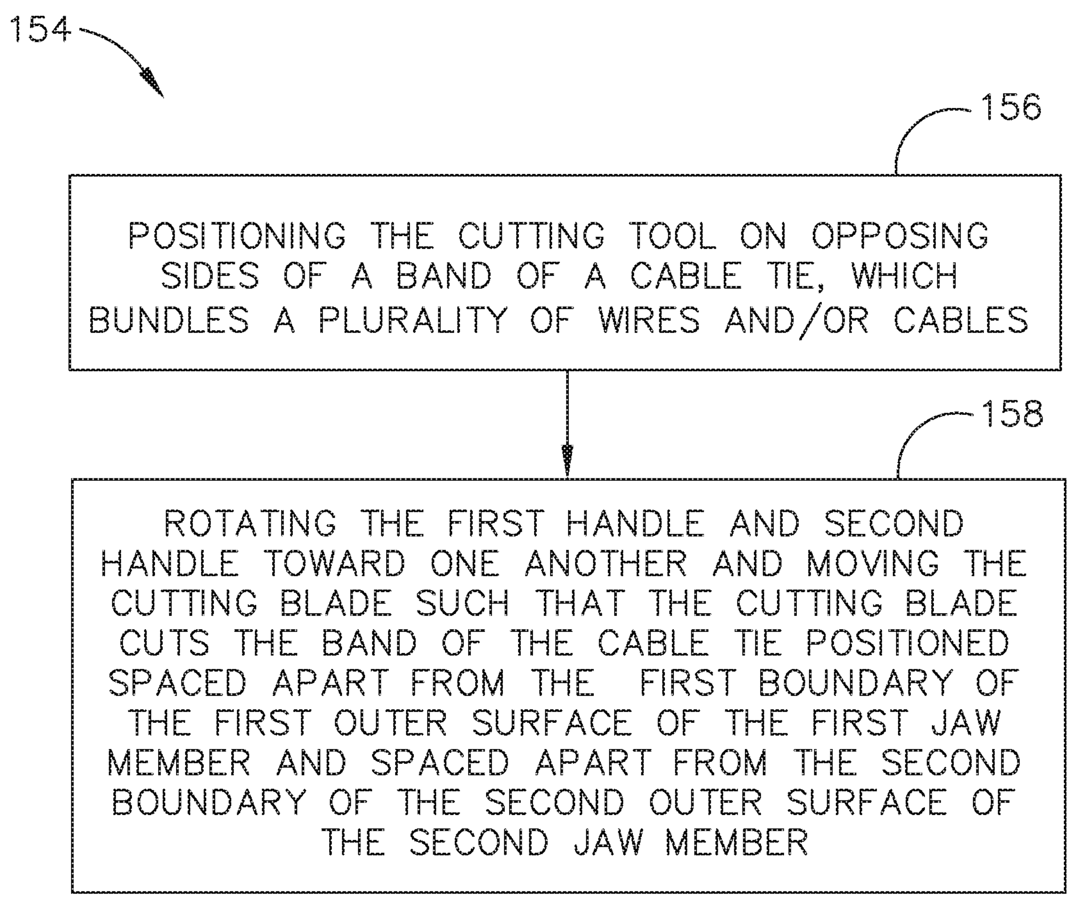
FIG. 12 is a flow chart of a method for operating the cutting tool.

Method 154, as seen in FIG. 12, for operating cutting tool 10 includes positioning 156 cutting tool 10 on opposing sides of band 16 of cable tie 12, which bundles a plurality of wires and/or cables 14, as seen in FIG. 5. Cutting tool 10 includes first arm assembly 18 which includes first jaw member 20 connected to first handle 22 and second arm assembly 24 which includes second jaw member 26 connected to second handle 28. First arm assembly 18 and second arm assembly 24 are rotatably connected to one another so as to rotate relative to one another. As discussed earlier, first jaw member 20 has first outer surface 32 which projects away in first direction 34 from first jaw member 20 as seen in FIG. 5. First outer surface 32 defines first boundary 36 and second jaw member 26 has second outer surface 38 which projects in second direction 40 away from second jaw member 26 and defines second boundary 42. As also discussed earlier, first boundary 36 includes outermost portion of first outer surface 32 of first jaw member 20 of cutting tool 10, wherein first boundary 36 extends along first jaw member 20. Second boundary 42 includes outermost portion of second outer surface 38 of second jaw member 26 of cutting tool 10, wherein second boundary 42 extends along second jaw member 26. Cutting blade 44 is positioned between first and second jaw members 20, 26 and is positioned spaced apart from first boundary 36 and second boundary 42 with the first and second jaw members 20, 26 positioned in one of open position 46 or closed position 48 as has been discussed earlier.

Method 154 further includes rotating 158 first handle 22 and second handle 28 toward one another with wires and/or cables 14 positioned on one side 49 of the first and second jaw members 20, 26 and moving cutting blade 44, as discussed earlier, positioned on an opposite side of the first and second jaw members, toward the first and second jaw members 20, 26 with the cutting blade 44 cutting band 16 of the cable tie 12 positioned on the opposite side 51 of the first and second jaw members 20, 26 spaced apart from first boundary 36 of first outer surface 32 and second boundary 42 of second outer surface 38 of second jaw member 26, as seen in FIG. 2. Also, as shown in FIG. 1, cutting blade 44 is spaced apart from first boundary 36 and second boundary 42 with cutting tool 10 positioned in open position 46.

First outer surface 32 of first jaw member 20 defines has first tapered configuration 50 and second outer surface 38 of second jaw member 26 defines second tapered configuration (not shown) which in this example is similar to first tapered configuration 50. First tapered configuration 50 and second configuration (not shown), as described earlier, facilitate the installer the ability to urge first and second jaw members 20, 26 into the bundle of wires and/or cables 14 without imparting damage to plurality of wires and/or cables 14.

Positioning 156 further includes positioning first tapered configuration 50, as seen in FIG. 7, and second tapered configuration (not shown) against and/or between adjacent wires and/or cables 14 within the plurality of wires and/or cables 14, as earlier discussed. Rotating 158 first handle 22 and second handle 28 toward one another, further includes, as described earlier, moving first jaw member 20 and second jaw member 26 to closed position 48 with maintaining the plurality of wires and/or cables 14 positioned on one side 49 of first and second jaw members 20, 26 and the cutting blade 44 and cutting band 16 positioned on opposite side 51 of first and second jaw members 20, 26. With rotating first handle 22 and second handle 28 toward one another, so as to move first and second jaw members 20, 26 to closed position 48, cutting blade 44 cuts band 16 of cable tie 12, as seen in FIG. 8, and positions, as discussed earlier, portion 60 of cutting blade 44 within first and second slots 58, 64 defined by a first and second surfaces 56, 62 of first and second jaw members 20, 26. As seen in FIGS. 9 and 10, first slot 58 is spaced apart from first boundary 36 of first jaw member 20 and second slot 64 is spaced apart from second boundary 42. As a result, with cutting blade 44 positioned within first and second slots 58, 64, cutting blade 44 is spaced apart from first and second boundaries 36, 42 and not permitting cutting blade 44 from contacting wires and/or cables 14 of the bundle.

While various embodiments have been described above, this disclosure is not intended to be limited thereto. Variations can be made to the disclosed embodiments that are still within the scope of the appended claims.

What is claimed is:

1. A cutting tool, comprising:

a first arm assembly comprising a first jaw member connected to a first handle;

a second arm assembly comprising a second jaw member connected to a second handle, wherein:

the first arm assembly and the second arm assembly are rotatably connected to one another with a first pivot member so as to rotate relative to one another; and the first jaw member has a first outer surface, which extends in a first direction and the first outer surface defines a first boundary, and the second jaw member has a second outer surface, which extends in a second direction and the second outer surface defines a second boundary, wherein the first direction is a different direction than the second direction; and a cutting blade is connected to a first and a second translational movement plates, and the first and second translational movement plates are connected to the first and second handles, such that rotation of the first and second arm assemblies relative to one another moves the first and second translational movement plates and cutting blade relative to the first pivot member, wherein:

the first direction and the second direction each extend away from the cutting blade, the cutting blade is positioned between the first and second jaw members, and the cutting blade is positioned spaced apart from the first boundary and the second boundary with the first and second handles positioned in one of an open position, with the first and second jaw members in an open position, or a closed position, with the first and second jaw members in a closed position.

2. The cutting tool of claim 1, wherein the first outer surface comprises a first tapered configuration which extends in the first direction and the second outer surface comprises a second tapered configuration which extends in the second direction.

3. The cutting tool of claim 2, wherein the first outer surface comprises a first curved surface extending from a first end of the first tapered configuration and the second outer surface comprises a second curved surface extending from a second end of the second tapered configuration.

4. The cutting tool of claim 1, wherein the first jaw member comprises a first surface defining a first slot and the second jaw member comprises a second surface defining a second slot, wherein with the first and second jaw members in the closed position, the cutting blade is positioned within the first slot of the first jaw member and within the second slot of the second jaw member and the cutting blade is positioned separated from the first boundary and the second boundary.

5. The cutting tool of claim 1, wherein the first pivot member comprises a threaded shaft which extends through a first opening defined in the first arm assembly and through a second opening defined in the second arm assembly.

6. The cutting tool of claim 5, wherein:

the threaded shaft of the first pivot member extends through a first plate slot defined by the first translational movement plate, which is positioned on a first side of the cutting tool, and the threaded shaft of the first pivot member extends through a second plate slot defined by the second translational movement plate, which is positioned on a second side of the cutting tool.

7. The cutting tool of claim 6, wherein:

the first pivot member comprises a head positioned at one end of the threaded shaft which has a first washer positioned between the head and the first translational movement plate; and the first pivot member comprises a nut with a second washer positioned between the nut, which is engaged to the threaded shaft of the first pivot member, and the second translational movement plate.

8. The cutting tool of claim 6, wherein the first plate slot and the second plate slot extend along in a third direction toward the cutting blade.

9. The cutting tool of claim 8, wherein:

the cutting blade is affixed to a first end portion of the first translational movement plate and the second translational movement plate;

a first lever arm is rotatably connected to a second end portion of the first and second translational movement plates and rotatably connected to the first handle; and a second lever arm is rotatably connected to the second end portion of the first and second translational movement plates and rotatably connected to the second handle, wherein:

a second pivot member comprises a threaded shaft which extends through a third opening defined by the second end portion of the first translational movement plate, through a fourth opening defined by the first lever arm and through a fifth opening defined by the second lever arm; and the second translational movement plate has a receptacle opening in which the threaded shaft of the second pivot member extends through the receptacle opening.

10. The cutting tool of claim 9, wherein the first plate slot, the second plate slot and the cutting blade are in alignment.

11. The cutting tool of claim 9, wherein:

the first lever arm is rotatably connected to the first handle; and the second lever arm is rotatably connected to the second handle, such that when the first and second handles are moved toward each other such that the first jaw member and the second jaw member move toward the closed position, the first and second lever arms move the first and second translational movement plates and the cutting blade in the third direction toward the first and second jaw members or when the first and second handles are moved away from each other such that the first jaw member and the second jaw member move toward the open position, the first and second lever arms move the first and second translational movement plates and the cutting blade in a fourth direction away from the first and second jaw members and in an opposite direction to the third direction.

12. The cutting tool of claim 11, wherein:

with the first and second jaw members positioned in the closed position, the cutting blade is positioned spaced apart from the first boundary of the first outer surface of the first jaw member and is positioned spaced apart from the second boundary of the second outer surface of the second jaw member; and the cutting blade is positioned within a first slot of the first jaw member and within a second slot of the second jaw member.

13. The cutting tool of claim 1, wherein a compression spring is positioned between the first handle and the second handle.

14. The cutting tool of claim 1, wherein the first handle has a first projection member extending away from the first handle, and the second handle has a second projection member extending away from the second handle.

15. A cutting tool, comprising:

a first arm assembly comprising a first jaw member connected to a first handle;

a second arm assembly comprising a second jaw member connected to a second handle, wherein:

the first arm assembly and the second arm assembly are rotatably connected to one another with a first pivot member so as to rotate relative to one another; and the first jaw member has a first outer surface, which extends in a first direction and the first outer surface defines a first boundary, and the second jaw member has a second outer surface, which extends in a second direction and the second outer surface defines a second boundary, wherein the first direction is a different direction than the second direction; wherein:

the first outer surface comprises a first tapered configuration which extends in the first direction and a second outer surface comprises a second tapered configuration which extends in the second direction, and the first outer surface comprises a first curved surface extending from a first end of the first tapered configuration and the second outer surface comprises a second curved surface extending from a second end of the second tapered configuration, and a cutting blade is connected to the first and second handles such that movement of the first and second handles moves the cutting blade toward or away from the first pivot member, wherein:

the first direction and the second direction each extend away from the cutting blade, the cutting blade is positioned between the first and second jaw members, and the cutting blade is positioned spaced apart from the first boundary and the second boundary with the first and second handles positioned in one of an open position, with the first and second jaw members in an open position, or a closed position, with the first and second jaw members in a closed position.

16. A method for operating a cutting tool comprising:

positioning the cutting tool on opposing sides of a band of a cable tie, which bundles a plurality of wires and/or cables, wherein:

a first arm assembly comprising a first jaw member connected to a first handle;

a second arm assembly comprising a second jaw member connected to a second handle, wherein:

the first arm assembly and the second arm assembly are rotatably connected to one another with a first pivot member so as to rotate relative to one another; and the first jaw member has a first outer surface, which extends in a first direction and the first outer surface defines a first boundary and the second jaw member has a second outer surface, which extends in a second direction and the second outer surface defines a second boundary, wherein the first direction is a different direction than the second direction; and a cutting blade is connected to a first and a second translational movement plates, and the first and second translational movement plates are connected to the first and second handles, such that rotation of the first and second arm assemblies relative to one another moves the first and second translational movement plates and cutting blade relative to the first pivot member, wherein:

the cutting blade is positioned between the first and second jaw members, and the cutting blade is positioned spaced apart from the first boundary and the second boundary with the first and second handles positioned in one of an open position, with the first and second jaw members in an open position, or closed position, with the first and second jaw members in a closed position; and rotating the first handle and the second handle relative to one another and toward one another with the plurality of wires and/or cables positioned on one side of the first and second jaw members and moving the cutting blade, positioned on an opposite side of the first and second jaw members, toward the first and second jaw members with the cutting blade cutting the band of the cable tie positioned on the opposite side of the first and second jaw members spaced apart from the first boundary of the first outer surface of the first jaw member and spaced apart from the second boundary of the second outer surface of the second jaw member.

17. The method of claim 16, wherein the first outer surface of the first jaw member defines a first tapered configuration and the second outer surface of the second jaw member defines a second tapered configuration.

18. The method of claim 17, wherein positioning further includes positioning the first tapered configuration and the second tapered configuration between adjacent wires and/or cables within the plurality of wires and/or cables.

19. The method of claim 17, wherein rotating the first handle and the second handle toward one another further includes moving the first jaw member and the second jaw member with maintaining the plurality of wires and/or cables positioned on the one side of the first and second jaw members and the cutting blade cutting the band positioned on an opposite side of the first and second jaw members.

20. The method of claim 16, wherein with rotating the first handle and the second handle toward one another further includes the cutting blade cutting the band of the cable tie and positioning a portion of the cutting blade within a first slot defined by a first surface of the first jaw member and within a second slot defined by a second surface of the second jaw member.

* * * * *